(12) United States Patent
Sun

(10) Patent No.: US 6,666,637 B1
(45) Date of Patent: Dec. 23, 2003

(54) SEGMENTED RING-NUT FOR GASKETED PRESSURE VESSEL OPENING

(75) Inventor: Nansheng Sun, Cambridge (CA)

(73) Assignee: Babcock & Wilcox Canada Ltd., Cambridge (CA)

( * ) Notice: Subject to any disclaimer, the term of this patent is extended or adjusted under 35 U.S.C. 154(b) by 0 days.

(21) Appl. No.: 10/307,756

(22) Filed: Dec. 2, 2002

(51) Int. Cl.[7] .............................. F16B 37/08; F16B 39/36
(52) U.S. Cl. ...................... 411/267; 411/270; 411/354; 411/433
(58) Field of Search ........................... 411/107, 267, 411/270, 389, 432, 433, 354

(56) References Cited

U.S. PATENT DOCUMENTS

| | | | |
|---|---|---|---|
| 1,143,005 A | * 6/1915 | Weston | ........................ 411/267 |
| 2,377,581 A | 6/1945 | Shaffrey | |
| 2,643,696 A | * 6/1953 | Misch | ........................ 411/270 |
| 3,157,215 A | * 11/1964 | Zahodiakin | ............. 411/270 X |
| 3,797,336 A | 3/1974 | Howe | |
| 4,083,288 A | 4/1978 | Williams | |
| 4,535,656 A | 8/1985 | Orban | |
| 5,282,709 A | 2/1994 | Chaput et al. | |
| 5,340,252 A | * 8/1994 | Weddendorf | ................ 411/267 |
| 5,522,681 A | 6/1996 | Pallini | |
| 5,703,916 A | 12/1997 | Wilhelm et al. | |
| 6,203,019 B1 | 3/2001 | Millman | |
| 6,416,268 B2 | * 7/2002 | Gethmann | ............. 411/354 X |

* cited by examiner

*Primary Examiner*—Neill Wilson
(74) *Attorney, Agent, or Firm*—Kathryn W. Grant; Eric Marich

(57) ABSTRACT

An internally threaded, segmented nut and conical bore for a pressure vessel are used to make removal of studs securing covers over openings through the pressure vessel wall. The segmented nut has a conical upper surface to mate with a corresponding surface of the conical bore when the stud is threaded through the internal thread of the nut and a load is applied. The segmented nut is easily replaced and the stud is easily removable due to the shape of the nut and bore. The segmented nut eliminates drilling and rethreading the bore to repair damaged threads.

10 Claims, 5 Drawing Sheets

SEGMENTED RING-NUT FOR GASKETED PRESSURE VESSEL OPENING

FIELD AND BACKGROUND OF INVENTION

The present invention relates generally to the field of pressure vessels of the type used in nuclear reactors and in particular to a new and useful device and method for reducing the difficulty and cost of repairing stud holes in pressure vessels.

Openings in pressure vessels are needed for a variety of reasons. These openings must be tightly sealed to maintain pressure in the vessel during operation of a nuclear reactor.

FIGS. 1 and 2 display a circular opening 12 through the wall of a pressure vessel 10 having a cover 50. Covered circular openings 12 in pressure vessels 10 typically have a joint between the opening 12 and the cover 50 sealed by a gasket 40. A diaphragm 45 across the opening 12 is provided to help seal the vessel opening 12. Pin holes 24 are provided to help align the cover 50 over the opening 12. The cover 50 is held to the pressure vessel 10 using several studs 20 positioned around the circumference of the cover 50.

The studs 20 are threaded into stud hole 26, an internally-threaded, blind bore in the vessel 10 shell. Threaded nuts 22 are threaded over the exposed ends of studs 20 and tightened against the top of the cover 50 (or closure head flange) for securing the cover 50 to the pressure vessel 10.

It is not unusual for an internally threaded blind hole such as stud hole 26 on the pressure boundary opening 12 to be damaged. In these cases, it can be repaired using a helical coil threaded insert.

To repair the damaged threaded stud hole 26, the current technology requires first drilling out the existing damaged threads using the drill size specified for the diameter of the helical coil insert being installed. Care must be taken not to drill the hole deeper than the original hole depth specified on the manufacturing drawing. Dimensional tolerance on the drilling diameter and depth must be guaranteed.

Once the damaged hole 26 is drilled out, then new internal threads must be machined in the hole 26 in order to install the helical coil inserts. This job is often done in a poor working environment where space is limited and the physical environment can be quite hazardous to workers. As a result, stud repair is a time-consuming, hazardous and costly process.

A further problem arises when a stud 20 becomes stuck in the bore 26. Removing a stuck stud is also very time-consuming and costly for current pressure vessels. In fact, it is sometimes impossible to unthread a stuck stud merely by turning the stud with a normal amount of torque, because of the hardened debris and galled threads.

Sometimes the only practical way to remove the stud from the threaded bore is to drill-out the stud from the bore, a more time-consuming and costly process. U.S. Pat. No. 5,703,916 indicates that at the time the patent was filed, the expense of drilling out a stuck stud can be as high as $300,000 per stud. At the same time, the damage prevents returning the pressure vessel to power until it can be repaired.

U.S. Pat. No. 5,703,916 describes a solution for repairing stuck studs of pressure vessel opening covers using hydraulic technology. The prior art solution does not change the connection of the studs with the blind bore from the known structure described above. Rather, hydraulic feed lines communicate with the bore through the stud. A pulsating fluid can be introduced through the feed lines to eliminate hardened debris and wash it from the bore. A suction pump is provided to remove the fluid and debris as it is forced from the stud/bore threaded joint. The cleaning effected by the hydraulic fluid then hopefully permits normal turning of the stud so that it can be removed.

Obviously, this solution can not eliminate the possibility of damaging the internally threaded blind hole, especially as the hydraulic fluid causes the stud to vibrate up and down against the threads to remove debris. As a result, the above repair process using helical coil inserts are still needed.

None of the prior art provides a good solution for easily repairing damaged bores or stuck studs in a cost-efficient manner. Thus, an improved connection for the cover of a pressure vessel opening which makes bore repair and/or stud removal easier and less costly is still needed.

SUMMARY OF INVENTION

It is an object of the present invention to provide a device which permits easier repair of stud bores in pressure vessels for connecting opening covers.

It is a further objection of the invention to provide a method and device for efficiently removing stuck studs and speeding bore repair for the closure of a pressure vessel opening.

Accordingly, a segmented nut is provided for inserting into a blind bore in a pressure vessel wall to receive one end of a stud used to secure a cover on an adjacent opening of the pressure vessel. The segmented nut is internally threaded on each part of the nut. The parts making up the nut join together to form a continuous thread and outer surface. The upper end of the nut has a conical shape; the end is tapered outwardly from the opening for the internal threads toward the outer side surface of the nut.

A method for using the segmented nut in a pressure vessel of a nuclear reactor includes forming a bore with a tapered upper end in the pressure vessel wall, and inserting the segmented nut into the bore oriented so that the tapered end of the nut can contact the tapered end of the bore. A stud is threaded into the internal threads of the segmented nut the stud and nut are tightened, forcing the tapered surfaces of the nut and bore together. The load on the stud is thereby translated to the pressure vessel.

The stud and segmented nut are easily replaced when needed. Relieving the load on the stud causes the segmented nut to loosen as they can expand outwardly because of the tapered surfaces. The stud can be easily removed, and replacing the segmented nut is all that is needed to repair damaged threads.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENTS

Figure 1:
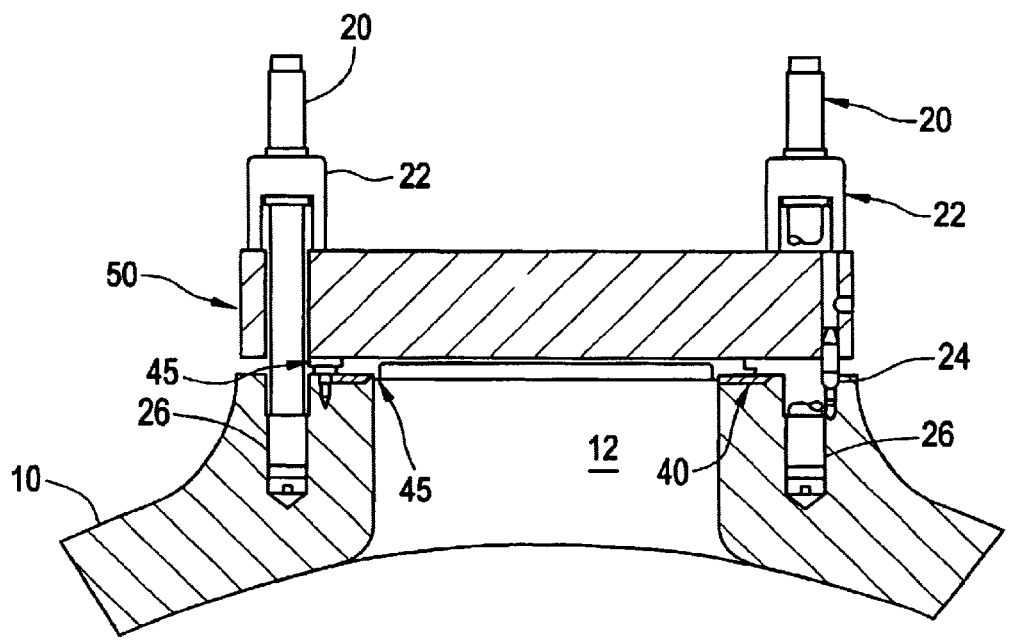
FIG. 1 is a sectional side elevation view of a prior art pressure vessel opening and cover.
Figure 2:
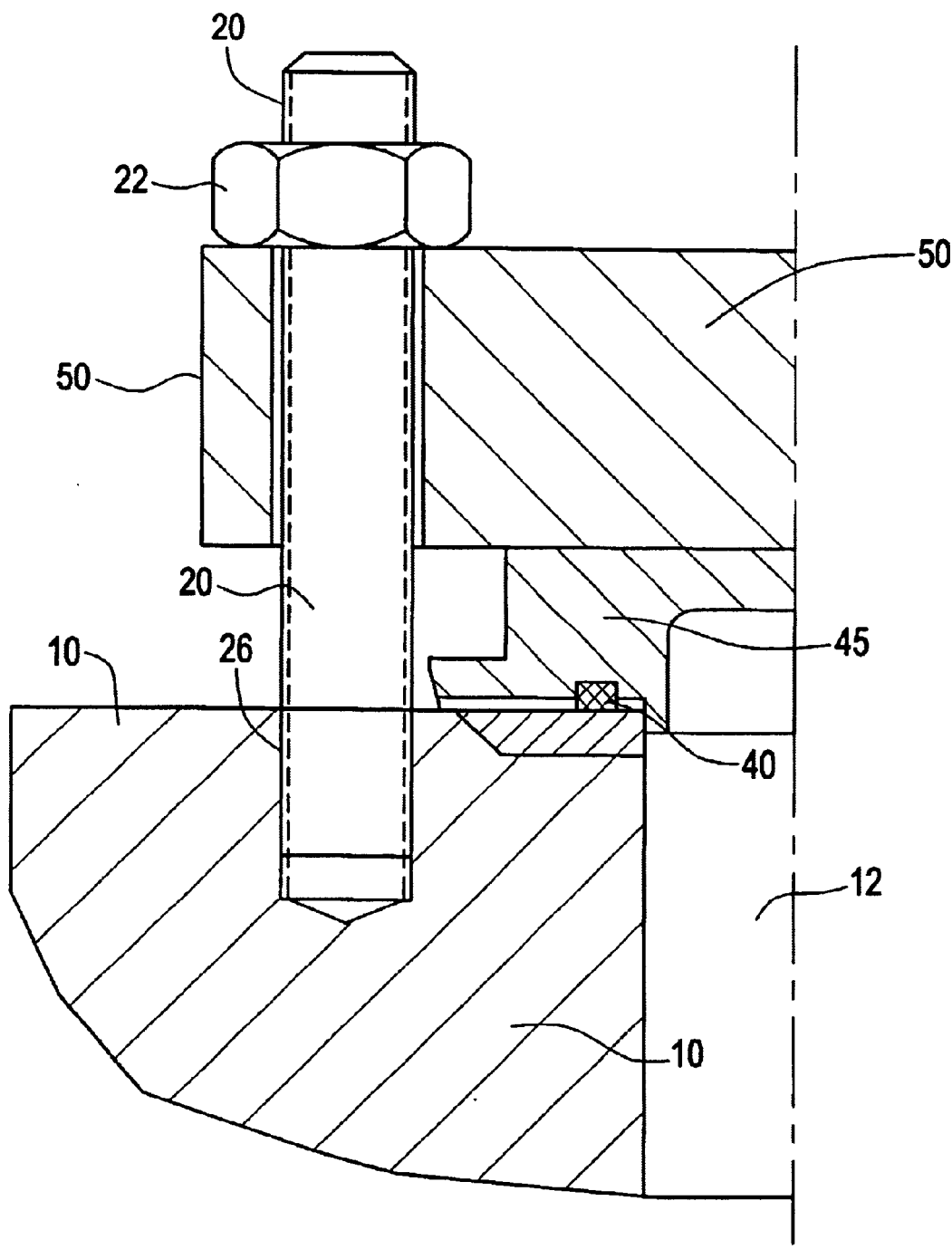
FIG. 2 is a magnified sectional side elevation view of one side of the prior art pressure vessel opening and cover of FIG. 1.
Figure 3:
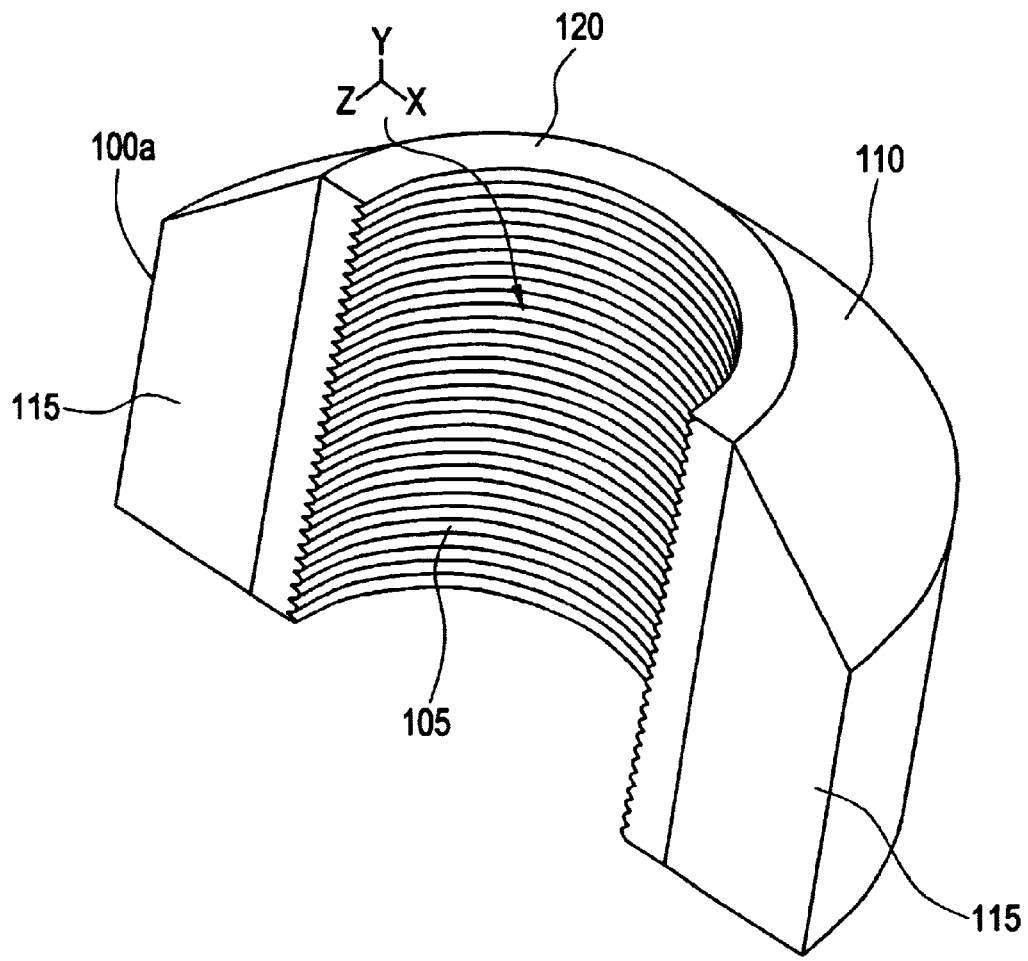
FIG. 3 is a top, front left side perspective view of one part of a segmented nut of the invention.

Referring now to the drawings, in which like reference numerals are used to refer to the same or similar elements, FIG. 3 shows one part 100a of a segmented nut 100 of the invention. As shown, the part 100a is half of the full nut 100 illustrated in FIG. 3A. The other half 100b of the segmented nut 100 forming the full nut 100 is a mirror image of part 100a shown in FIG. 3.

Figure 3A:
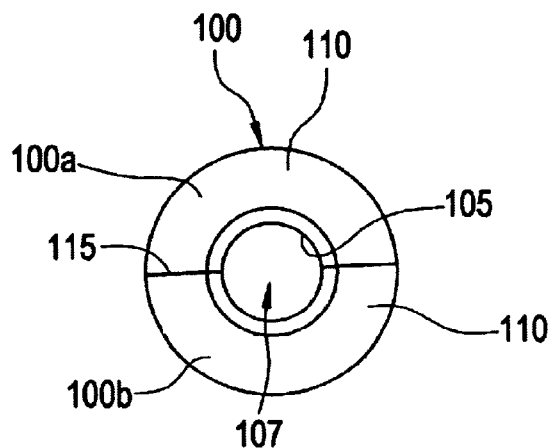
FIG. 3A is a top plan view of a whole segmented nut, including the part of FIG. 3.

Referring to FIGS. 3 and 3A together, the whole segmented nut 100 has an upper end 120, surrounded by a conical tapered surface 110. A corresponding part of a set of internal threads 105 is provided on each part 100a, 100b of segmented nut 100 in channel 107 through the nut 100. A pair of mating surfaces 115 correspond to identically shaped surfaces on the other part 100b of the full nut 100, and contact those surfaces when the parts 100a, 100b are assembled to form the full nut 100.

Figure 4:
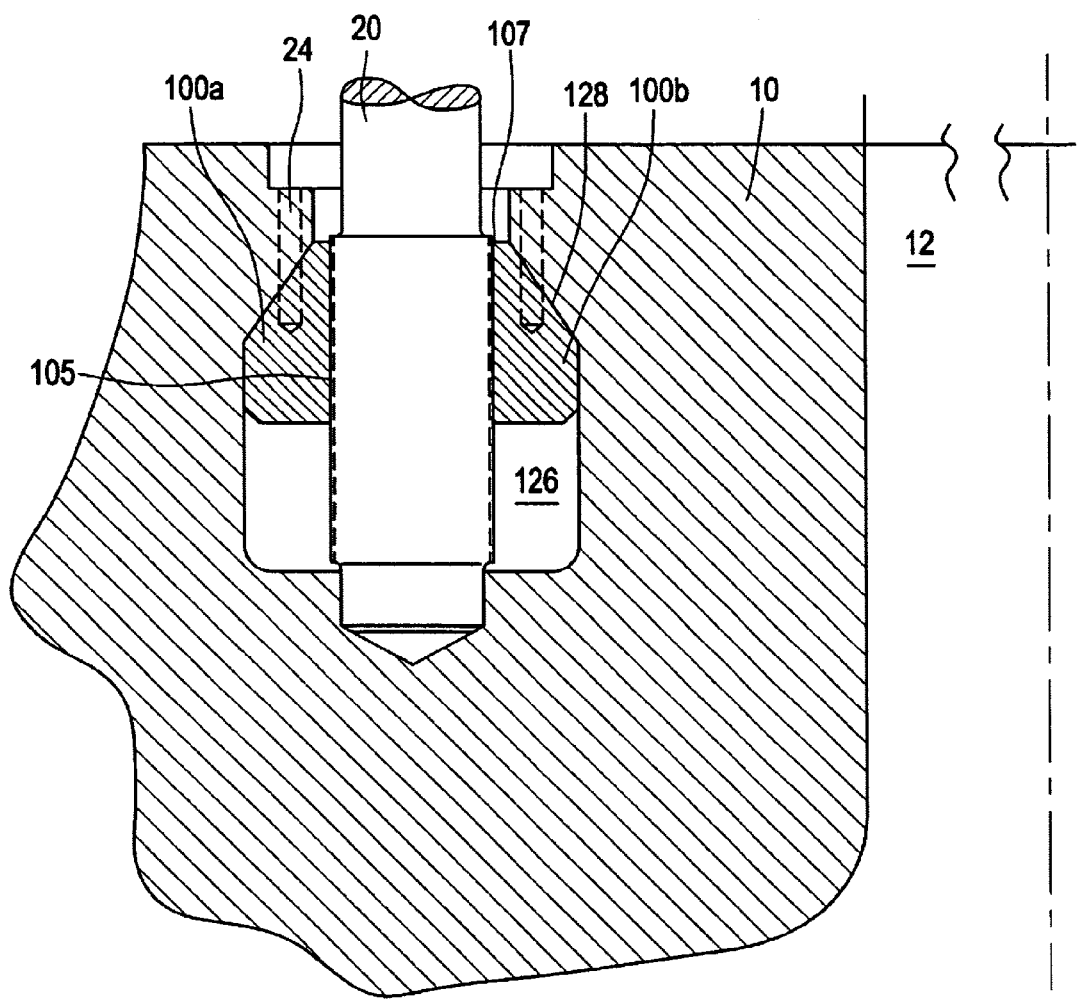
FIG. 4 is a sectional side elevation view of a pressure vessel opening and cover held closed using the nut of FIGS. 3 and 3A.

FIG. 4 illustrates a section of a pressure vessel 10 wall adjacent an opening 12 in the pressure vessel 10. A conical bore 126 having an upper tapered surface 128 is provided in the pressure vessel 10 adjacent the opening. The conical bore 126 is adapted to receive the nut parts 100a, 100b of a segmented nut used to secure a threaded stud 20. Pin holes 24 are provided to help locate a cover (not shown in FIG. 4) over opening 12 for securing the cover using the studs 20 and segmented nut formed by nut parts 100a, 100b.

Figure 3B:
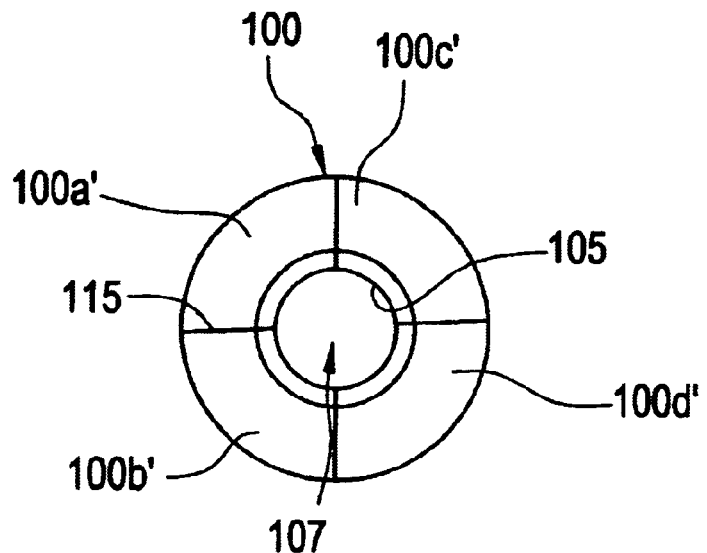
FIG. 3B is a top plan view of a whole segmented nut according to an embodiment of the invention.
Figure 3C:
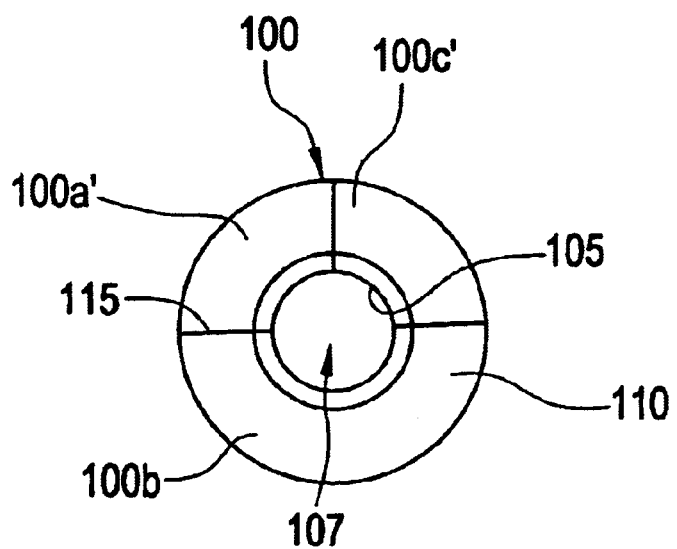
FIG. 3C is a top plan view of a whole segmented nut according to an embodiment of the invention.

The segmented nature of the nut 100 permits insertion of each nut part 100a, 100b into the bore 126, which would not be possible if the nut 100 were unitary. While segmented nut 100 is illustrated as having two halves 100a, 100b, it is envisioned that the nut 100 may be divided into further parts, such as thirds, quarters (see, for example, nut parts 100a', 100b', 100c', and 100d', as shown in FIG. 3B), fifths, etc. The number of nut segments is preferably two because there are fewer parts and less pieces to maneuver. And, while it is preferable that the nut 100 is segmented into equal size parts, it is not essential and the parts making up one whole nut 100 may be differently sized (see, for example, nut parts 100a', 100b, and 100c', as shown in FIG. 3C), so long as the parts will fit into bore 126 and form a single continuous nut 100.

Once they are inserted, the nut parts 100a, 100b are aligned with each other inside the bore to form the segmented nut 100 with channel 107 for receiving a stud 20.

The tapered surface 128 of the conical bore 126 is shaped to correspond to the tapered surface 110 of the nut 100 formed by nut parts 100a, 100b. The tapered surfaces 110, 128 mate evenly with each other, so that the nut 100 can be tightened in contact against the tapered surface 128 of the bore 126.

In use, a stud 20 is inserted through a cover 50 (not shown in FIG. 4) aligned over opening 12 by pins and pin holes 24. The stud 20 is threaded into the internal threads 105 of the segmented nut 100 inside bore 126. As the stud 20 and nut 100 are tightened together, the tapered surfaces 110, 128 force the nut 100 to snugly fit against the stud 20. At the same time, the tapered surfaces 110, 128 translate the load on the stud 20 to the vessel 10.

Although not shown in FIG. 4, a gasket 40 and diaphragm 45 may be used to help seal the cover 50 to the opening 12 as in the prior art opening cover.

So long as a load is applied to the stud 20, the nut parts 100a, 100b are forced to clamp tightly against the stud 20 as well as against the bore tapered surface 128.

If it becomes necessary to replace the threads 105 holding the stud 20, the load on stud 20 is removed, thus loosening the clamping effect of the nut 100 on the stud 20. Then, the stud 20 is easily unthreaded from the segmented nut 100 and removed. The parts 100a, 100b of the segmented nut 100 are removed from the bore 126 and replaced with new nut parts 100a, 100b with new threads 105. No drilling or rethreading of the bore is required to replace the threads 105 that are securing the stud 20. This significantly reduces the time, effort and cost associated with replacing the threads for stud bores 126.

A further advantage of the invention is that the conical or tapered surfaces 110, 128 of the nut 100 and bore 126 help compensate for wear on the threads and will extend the life of studs secured using the segmented nut 100. And, the tapered surfaces 110, 128 also reduce the stress placed on the vessel 10 wall where the studs are secured.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles.

What is claimed is:

1. A fastener arrangement for a cover used to seal an opening of a pressure vessel, the fastener arrangement comprising:

a bore in the pressure vessel adjacent the opening having an inner upper conical surface; and a segmented nut having an upper conical surface complementary to the inner upper conical surface of the bore, an internally threaded channel through the nut for receiving a stud, the segmented nut comprising at least two nut parts mated together to form a continuous body.

2. The fastener arrangement of claim 1, wherein each of the at least two nut parts is the same size.

3. The fastener arrangement of claim 1, wherein at least a pair of the at least two nut parts have different sizes.

4. The fastener arrangement of claim 1, wherein the segmented nut comprises at least three nut parts.

5. A fastener for receiving a stud used to secure the cover of an opening in a pressure vessel wall, the pressure vessel wall having a bore with an internal upper conical surface formed adjacent the opening, the fastener comprising a segmented nut formed of at least two nut parts separably mated together to form a unitary body, the segmented nut having an internally threaded channel through the unitary body for threading on the stud and an upper conical surface corresponding to the internal upper conical surface of the bore.

6. The fastener of claim 5, wherein each of the at least two nut parts is the same size.

7. The fastener of claim 5, wherein at least a pair of the at least two nut parts have different sizes.

8. The fastener of claim 5, wherein the segmented nut comprises at least three nut parts.

9. A method for replacing a damaged fastener holding a stud used to secure the cover of an opening in a pressure vessel wall, the pressure vessel wall having a bore with an internal upper conical surface formed adjacent the opening, the damaged fastener comprising a segmented nut formed of at least two nut parts separably mated together to form a unitary body, the segmented nut having an internally threaded channel through the unitary body for threading on the stud and an upper conical surface corresponding to the internal upper conical surface of the bore, the method comprising:

unthreading the stud from the internally threaded channel;

removing the cover;

removing the at least two nut parts of the segmented nut forming the damaged fastener from the bore;

providing a replacement segmented nut having the same dimension internally threaded channel as the damaged fastener and formed by at least two replacement nut parts; and inserting the at least two replacement nut parts into the bore.

10. The method of claim 9, further comprising:

replacing the cover; and threading the stud into the internally threaded channel of the replacement segmented nut.

\* \* \* \* \*